United States Patent [19]
Burke, III et al.

[11] Patent Number: 5,834,086
[45] Date of Patent: Nov. 10, 1998

[54] PROCESS FOR MANUFACTURING A DUST CONTROL MAT INCLUDING SIDE STRIPS FOR ENHANCED TEAR RESISTANCE

[75] Inventors: William O. Burke, III; Robert C. Kerr, both of LaGrange, Ga.

[73] Assignee: Milliken Research Corporation, Spartanburg, S.C.

[21] Appl. No.: 455,429

[22] Filed: May 31, 1995

Related U.S. Application Data

[63] Continuation-in-part of Ser. No. 265,926, Jun. 27, 1994, abandoned.

[51] Int. Cl.$^6$ ............................................. B32B 9/00
[52] U.S. Cl. ..................... 428/95; 428/61; 428/62; 428/77; 428/82; 428/85; 428/96; 428/126; 428/192; 428/198; 264/243; 264/510; 264/552; 156/72; 156/299; 156/300
[58] Field of Search .................. 428/95, 85, 96, 428/198, 77, 126, 192, 62, 61, 82, 492; 156/72, 300, 299, 60; 264/243, 510, 552

[56] References Cited

U.S. PATENT DOCUMENTS

| | | | |
|---|---|---|---|
| 2,254,210 | 9/1941 | Cunnington | 154/49 |
| 3,306,808 | 2/1967 | Thompson et al. | 161/66 |
| 3,953,631 | 4/1976 | Gordon | 428/95 |
| 3,956,551 | 5/1976 | Richards | 428/88 |
| 4,741,065 | 5/1988 | Parkins | 15/217 |
| 4,886,692 | 12/1989 | Kerr et al. | 428/82 |
| 4,902,465 | 2/1990 | Kerr et al. | 264/257 |
| 5,227,214 | 7/1993 | Kerr et al. | 428/95 |
| 5,233,787 | 8/1993 | Andersen | 43/132.1 |
| 5,240,530 | 8/1993 | Fink | 156/94 |
| 5,305,565 | 4/1994 | Nagahama et al. | 52/177 |
| 5,350,478 | 9/1994 | Bojstrup et al. | 156/299 |

*Primary Examiner*—Patrick Ryan
*Assistant Examiner*—Abraham Bahta
*Attorney, Agent, or Firm*—Terry T. Moyer; James M. Robertson

[57] ABSTRACT

A process for the application of tear resistant edge strip material to a rubber base sheet of a launderable dust control mat is provided. The process involves the in-line mating of first and second strips of carboxilated rubber to the longitudinal borders of a rubber sheet by means of a series of pressure rolls. The process permits separate rubber sheet and side strip materials to be joined in a continuous or semi-continuous operation immediately prior to assembly of a mat thereby enhancing material handling efficiencies. An apparatus for carrying out the invention is also provided.

16 Claims, 4 Drawing Sheets

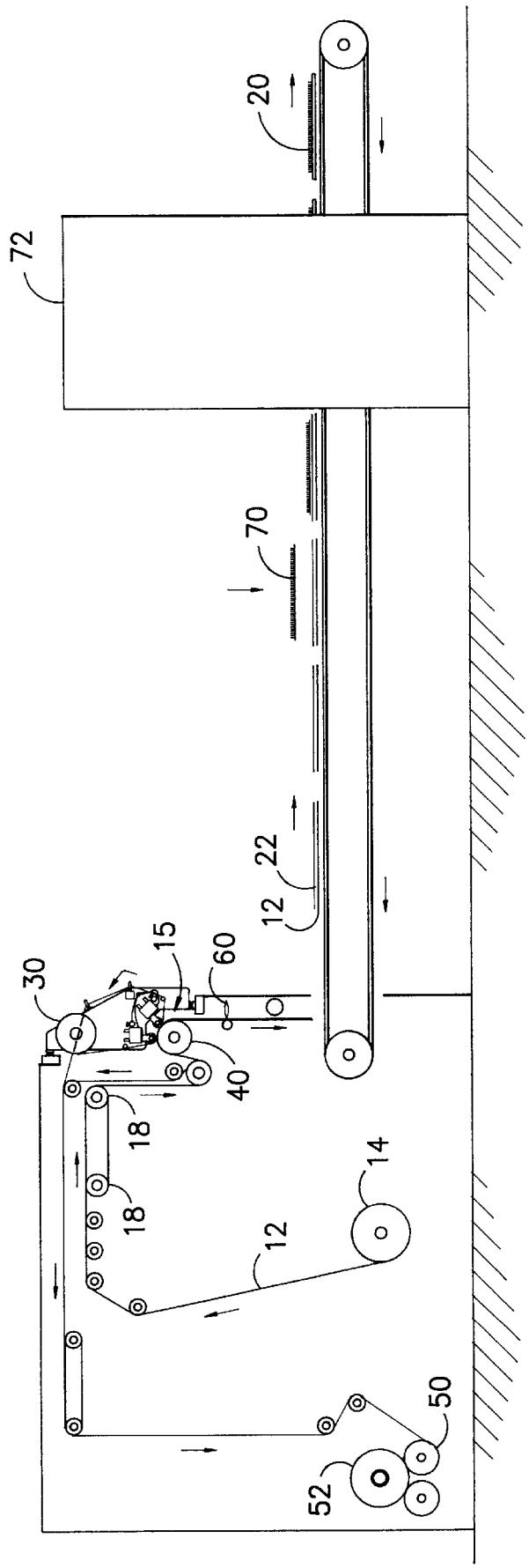
FIG. -1-

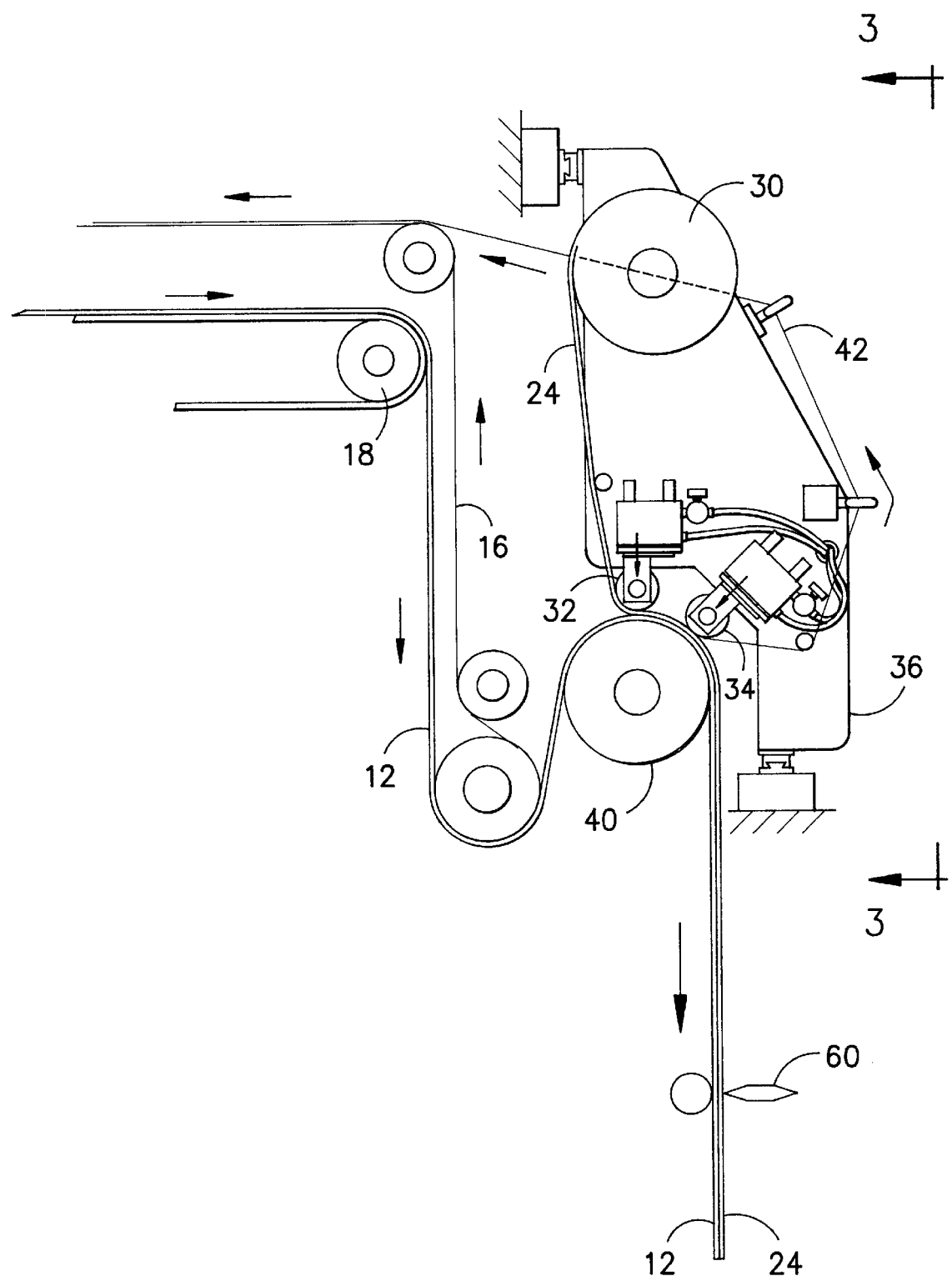
FIG. -2-

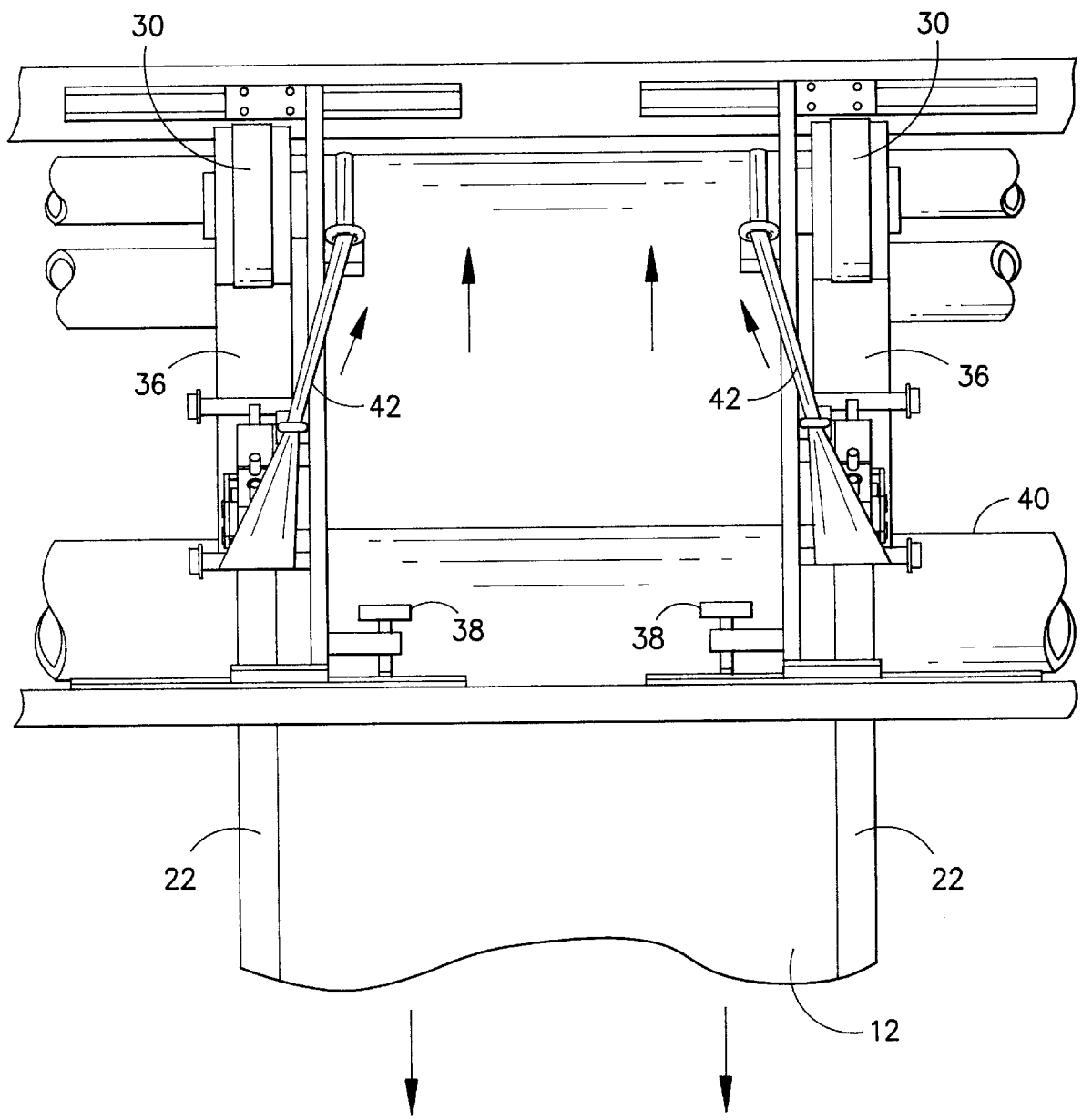
FIG. -3-

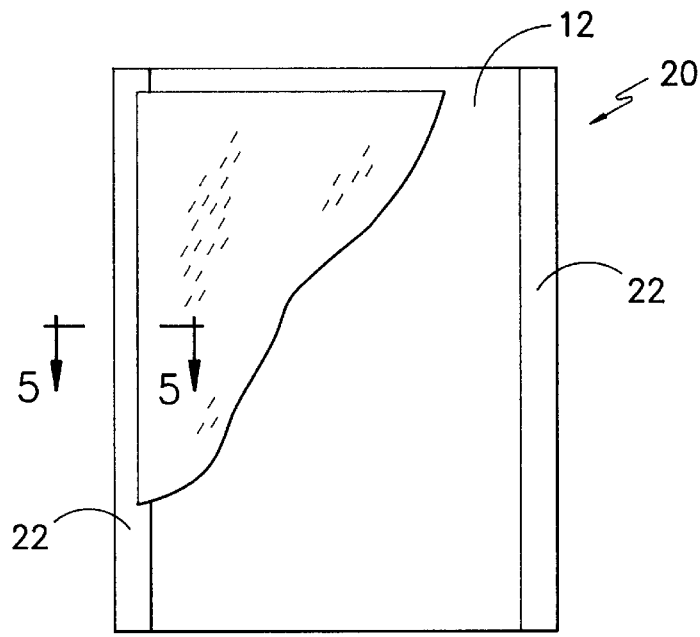
FIG. —4—
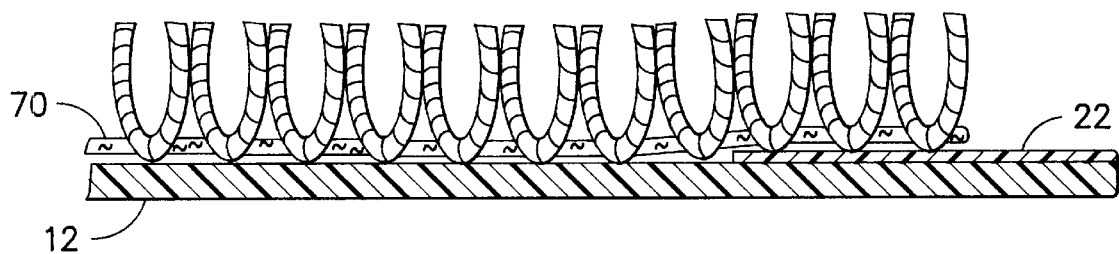
FIG. —5—
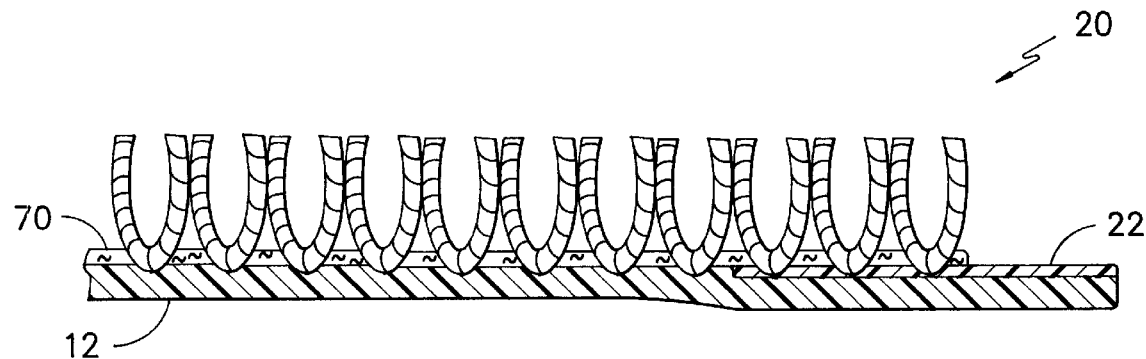
FIG. —6—

PROCESS FOR MANUFACTURING A DUST CONTROL MAT INCLUDING SIDE STRIPS FOR ENHANCED TEAR RESISTANCE

CROSS-REFERENCE TO RELATED APPLICATION

This application is a continuation-in-part of application Ser. No. 08/265,926 filed Jun. 27, 1994, now abandoned, for DUST CONTROL MAT WITH CO-CALENDERED REINFORCING STRIPS filed in the name of Robert C. Kerr. The disclosure of this application being incorporated herein by reference.

FIELD OF THE INVENTION

The present invention relates to the production of a dust control mat and more particularly to a process and related apparatus for the manufacture of a dust control mat including side strips for enhanced tear resistance. Specifically, the process of the present invention provides for the in-line joiner of side strips to a rubber backing sheet material by automated pressure application means.

BACKGROUND

During its practical use as a mat and its periodic wash and drying processing in industrial laundries, the primary physical damage that is encountered by a rubber back, press molded mat is the tearing of the longitudinal border. This tearing typically occurs at the edge of the piled textile covering on the mat. The edge of the piled textile covering is referred to as the border interface on the mats.

As will be appreciated by those of skill in the art, tearing on the leading and tailing edges of the mats is not generally considered to be a problem by the industry. Accordingly, the process and apparatus of the present invention will be described in relation to the lamination of reinforcing strips along longitudinal borders of the mat. It is to be understood, however, that a mat could also include reinforcing strips along the leading and tailing edges of the mat if desired.

The art includes a number of configurations and features for various floor mats. Some patents which are believed to be illustrative of known mats include U.S. Pat. Nos. 2,254,210 to Cunnington, issued Sep. 2, 1941; 3,306,808 to Thompson, et al. issued Feb. 28, 1967; 3,953,631 to Gordon issued Apr. 27, 1976; 4,741,065 to Parkins issued May 3, 1988; 4,886,692 to Kerr et al. issued Dec. 12, 1989; 5,227,214 to Kerr et al. issued Jul. 13, 1993; 5,240,530 to Fink issued Aug. 31, 1993; 5,305,565 to Nagahama et al. issued Apr. 26,1994; and 5,350,478 to Bojstrup et al. issued Sep. 27, 1994; all of which are incorporated herein by reference.

The construction of mats using rubber backing sheets which nonetheless provide good tear resistance has generally been limited to the following methods:

1. The formulation of high tear and high tensile strength rubber in a uniform thick sheet (typically 59–65 mils) which extends beyond the dimensions of the pile covering; and 2. The construction of a five piece rubber mat backing which constitutes a uniform thick (typically 40–45 mils) sheet which serves as the body piece and which is smaller in dimensions than the textile covering and four strips of rubber (typically twice as thick as the body piece) which are manually placed beneath the textile edges of the mat.

In the vulcanization of a rubber backed mat with a textile covering, the longitudinal edges of the textile tend to embed deeper within the rubber as compared to other portions of the mat. This embedding is believed to result from the rubber flow at the border of the textile covering as pressure is applied from an inflatable diaphragm and the rubber undergoes reduced viscosity due to the application of heat. As will be appreciated, the unrestrained rubber movement in the border allows the longitudinal edges of the textile to move deeper into the rubber backing thus creating a thinning of the rubber at the border interface. As indicated previously, it is this thinner interface which is susceptible to tears during the mat's use and industrial laundry processing.

In attempts to alleviate such tearing of the rubber mat, the industry has relied on the two previously described methods of production. Method 1 has an advantage of minimum labor requirements and cycle times but requires the use of a relatively thick rubber backing which tends to make the mat heavier and to increase raw material costs. Method 2 permits the use of a thinner rubber backing which is desirable for laundry processing. However, the five piece construction has the drawback of requiring additional labor to carry out placement of the edge portions and longer vulcanization times to cure the thicker rubber edges compared to the thinner body section beneath the textile covering.

It has been suggested that built up edge strips may be co-calendered with the rubber backing sheet as the backing sheet is produced. Thereafter, the backing sheet material (including the built up edges) may be delivered in roll form to the mat manufacturing location. While such a co-calendering operation is effective in producing rubber sheets with enhanced edge thickness, it has been found that there is some difficulty in the handling of rolls of such co-calendered material since the edges have a thickness several mil thicker than the interior. Due to this difference in thickness, a roll of the material takes on a substantially dog-bone profile wherein the outer edges of the roll are of greater diameter than the center. As will be appreciated, this disparity in diameter increases dramatically with any increase in the outer edge thickness. Moreover, a significant disparity in roll diameter may give rise to difficulty in later processing steps as the backing material is drawn off the roll for production of the mat. Specially, with a significant difference in diameter along the length of the roll it may be difficult to maintain a constant feed of the backing material without the occurrence of folds or wrinkles along the surface of the material.

In light of the above, it will be appreciated that there is a need for a process and apparatus to efficiently apply a tear-resistant border to a rubber backing sheet for a dust control mat as an in-line operation during the assembly of the mat. The present invention thus represents a useful advancement over prior practice.

OBJECTS AND SUMMARY

In view of the foregoing, it is a general object of the present invention to provide a process for the application of tear resistant edge strip material to a rubber base sheet of a launderable dust control mat.

In that respect, it is an object of the present invention to provide a process and related apparatus for the in line application of edge strip material to a rubber base sheet during production of a launderable dust control mat.

It is a related object of the present invention to provide a process and related apparatus for the automated application rubber edge strip material to a rubber base sheet of a launderable dust control mat wherein the edge strip material is joined to the base sheet of rubber by the concurrent mating and application of pressure prior to vulcanization of the rubber sheet material.

Accordingly, in one aspect of the present invention a method for producing a dust control mat including side strips for enhanced tear resistance is provided. The method comprises the steps of:

(a) simultaneously mating first and second strips of perforated carboxylated rLbber to the longitudinal borders of a rubber sheet;

(b) joining said first and second strips of perforated carboxylated rubber to said rubber sheet by means of pressure applied by a plurality contacting rollers while step "a" is ongoing;

(c) delivering said rubber sheet directly to an in-line cutter following joining step "b";

(d) cutting said rubber sheet to a desired length;

(e) placing a pile fabric on said rubber sheet to form a pile composite; and (f) vulcanizing said pile composite to form a unitary structure.

BRIEF DESCRIPTION OF THE DRAWINGS

FIG. 1 is a schematic of the process and apparatus of the present invention.

FIG. 2 is a side view illustrating the pressure bonding process of the present invention.

FIG. 3 is a view taken along line 3—3 of FIG. 2.

FIG. 4 is a top view in partial cross section of a rubber backed mat produced by the process of the present invention.

FIG. 5 is a view taken along line 5—5 of FIG. 4 prior to vulcanization.

FIG. 6 is a view similar to FIG. 5 following vulcanization.

While the invention will be described in connection with preferred embodiments and procedures, it is to be understood that the invention is in no way intended to be limited by such description. On the contrary, it is intended to cover all alternatives, modifications and equivalents as may be included within the true spirit and scope of the invention as defined by the claims appended hereto.

DESCRIPTION

Turning now to the drawings wherein like reference numerals designate like components in the various views, in FIG. 1 there is shown in profile a schematic of the process and related apparatus of the present invention. In the illustrated and preferred practice, a mat backing sheet 12 of green (i.e. unvulcanized) rubber is delivered from a mounted roll 14 along a path to a strip application station 15 as described further below. The mat backing sheet is preferably between about 36 inches wide and about 48 inches wide with a thickness of between about 40 mils and about 65 mils.

As will be appreciated, the rubber of the mat backing sheet is relatively soft and tacky. The rubber is therefore typically covered with a detachable film covering 16 which may be stripped away from the rubber after it is unrolled for processing (FIG. 2).

As shown in FIG. 1, in the preferred practice the mat backing sheet 12 along with its corresponding film covering 16 are delivered over a plurality of adjustable rollers 18 which are used to provide uniform tension to the mat backing sheet 12 as it is delivered for processing. The rubber of the mat backing sheet is susceptible to developing creases and other discontinuities across the surface during processing. The detachable film 16 is believed to help prevent the occurrence of such discontinuities by enhancing the stability of the mat backing. In the preferred practice, the detachable film is therefore removed after the mat backing sheet has been conveyed nearly to the side strip application station as discussed below.

A mat 20 produced by the process of the present invention is illustrated in FIG. 4. A strong non-tufted border 22 (FIG. 4) is desirable along the lateral edges of the mat 20 to avoid tears during use and cleaning.

Since the mat backing sheet is best handled in roll form but is susceptible to creases and folds, it may be undesirable to have a border in place prior to forming the roll 14. If a built-up border is in place when the roll 14 is formed, the outer diameter of the roll 14 will be substantially greater than the diameter at the center of the roll. This difference in diameter may make it difficult to effect uniform delivery of the roll material for further processing. By way of example, it has been found that a 59 mil rubber backing sheet with a co-calendered border built up greater than 10 mils is susceptible to an undue number of creases when the rubber backing is unrolled.

As shown in FIGS. 1, 2, and 3, the process of the present invention permits the in-line application of an edge strip 24 along the border of the mat backing sheet 12 after the backing sheet 12 after the backing sheet is unrolled. This allows for uniformity in the backing sheet roll 14 while still permitting the advantages of a built-up border. Moreover, the border which is applied in the present process may have a thickness up to about 60 mils.

Referring primarily to FIGS. 2 and 3, in the illustrated and preferred practice, reinforcing edge strips 24 of carboxylated rubber are delivered from two laterally spaced strip supply rolls 30 for attachment to the outboard edges of the mat backing sheet 12. This attachment is effected by the application of pressure across edge strips 24 as they are in contact with the edge of the rubber mat backing. As illustrated, this pressure attachment is preferably carried out by two pneumatic pressure rolls 32, 34 arranged in series along the path of the edge strip material. The first pressure roll 32 preferably has a slightly knurled surface and applies a pressure of about 10 psig while the second pressure roll 34 is preferably substantially smooth and applies a pressure of about 10 psig. The edge strips 24 are preferably about 2 inches wide with slight perforations to promote the elimination of entrapped air between the edge strips and mat backing sheet. As will be appreciated, while it may be desirable to apply the edge strips 24 simultaneously to opposing outboard edges of the mat backing sheet the strips could likewise be applied in individual separate operations.

As shown, the strip supply rolls 30 along with the first and second pressure rolls 32, 34 are preferably mounted on carriage assemblies 36 disposed at either edge of the path traveled by the mat backing sheet 12. In the preferred embodiment, these carriage assemblies are moveable by adjustment of pin assemblies 38 to change the width of the setting so as to permit processing of mat backing sheets having a range of widths.

It will be appreciated that the delivery of the edge strip 24 should be synchronized with the delivery of the mat backing sheet to the point of pressure application so as to permit the concurrent mating and joinder edge strip material along the border of the mat backing sheet. In the illustrated and potentially preferred practice, this synchrony is achieved by use of a common drive roll 40 for unrolling both the backing sheet and the edge strips. By using a common drive roll 40 which spans the width of the backing sheet, uniform delivery rates are achieved at all areas.

Since the rubber of the edge strips 24 is somewhat tacky, it is covered on one side with a detachable film 42 similar to that which is used on the mat backing sheet. As best seen in FIG. 2, this film is preferably removed immediately following the pressure application of the edge strip to the border of the mat backing sheet. This arrangement permits the first and second pressure rolls 32, 34 to contact the edge strips 24 with the benefit of a protective barrier.

After the pressure joining operation, the detachable film from the edge strips is preferably drawn away from the strip application station by a drive assembly 50 along with the detachable film 16 for the rubber backing sheet to a roll of used film material 52 which may then be recycled.

During practice of the present invention, the rubber backing sheet 12, and edge strips 24 along with their respective protective films 16 and 42 are threaded into place. Thereafter, the drive roll 40 is activated and an edge strip 24 is applied along any desired length of the mat backing sheet 12. Once the desired length has been reached, the mat backing is cut by a cutter 60 of any desired type.

The rubber backing sheet 12 along with the applied borders 22 is thereafter placed on an endless conveyor and indexed to a station where a textile substrate 70 such as a tufted pile substrate is placed in overlying relation to the backing sheet such that the edges of the textile substrate overlap a portion of the applied borders 22 (FIG. 5). The textile substrate and backing are then conveyed to a vulcanizing unit 72 as is well known to those of skill in the art. In the potentially preferred practice, the vulcanization is carried out for about 20–27 minutes using steam maintained at a pressure of about 70 psig. The resultant finished mat 20 is illustrated in FIG. 6.

In simplest form of the invention, the cut edge of the mat 20 will not have a reinforced border. However, in a potential practice, borders on the leading and tailing edges may be provided. Specifically, end strips may be inserted between the applied borders 22 on both the leading and tailing edges of the backing sheet 12 and vulcanized thereto during the vulcanization step.

As previously indicated, the preferred material for the edge strip 24 is a carboxylated nitrile rubber. By application of such an edge strip, the resulting tensile strengths at the mat borders are approximately twice that of pure nitrile rubber.

In light of the above, it will be appreciated that the present invention provides a process and related apparatus for the in-line application of longitudinal borders of substantially enhanced tear resistance to pile fabric dust control mats.

While specific embodiments of the invention have been shown and described, it will be understood, of course, that the invention is not limited thereto, since modifications may be made and other embodiments of the principles of this invention will occur to those skilled in the art to which this invention pertains. Therefore, it is contemplated by the appended claims to cover any such modifications and other embodiments as incorporate the features of this invention within the true spirit and scope of the following claims.

What is claimed is:

1. In an in-line process for the production of a dust mat, a method comprising the steps of:
    (a) mating at least a first strip of carboxylated rubber to a first longitudinal border of a rubber sheet;
    (b) joining said first strip of carboxylated rubber to said rubber sheet by application of pressure to said first strip of carboxylated rubber while mating step "a" is ongoing;
    (c) mating at least a second strip of carboxylated rubber to a second longitudinal border of said rubber sheet;
    (d) joining said second strip of carboxylated rubber to said sheet of rubber sheet by application of pressure to said second strip of carboxylated rubber while mating step "c" is ongoing;
    (e) delivering said rubber sheet to an in-line cutting station subsequent to joining steps "b" and "d";
    (f) cutting said rubber sheet to a desired length;
    (g) placing a pile fabric on said rubber sheet to form a pile composite; and
    (h) vulcanizing said pile composite to form a unitary structure.

2. The invention as in claim 1, wherein mating steps "a" and "c" are carried out concurrently.

3. The invention as in claim 2, wherein joining steps "b" and "d" are carried out concurrently.

4. The invention as in claim 3, wherein in joining steps "b" and "d" pressure is applied to said first and second strips of carboxylated rubber by means of contacting rollers disposed at the longitudinal borders of said rubber sheet.

5. The invention as in claim 4, wherein at least a portion of said contacting rollers have a knurled surface.

6. The invention as in claim 1, wherein said first and second strips of carboxylated rubber are perforated.

7. The invention as in claim 1, wherein said first strip of carboxylated rubber has a thickness of greater than about 10 mils.

8. The invention as in claim 7, wherein said second strip of carboxylated rubber has a thickness of greater than about 10 mils.

9. The invention as in claim 8, wherein said rubber sheet has a thickness not greater than about 65 mils.

10. In an in-line process for the production of a dust mat, a method comprising the steps of:
    (a) simultaneously mating first and second strips of perforated carboxylated rubber to the longitudinal borders of a rubber sheet;
    (b) joining said first and second strips of perforated carboxylated rubber to said rubber sheet by means of pressure applied by a plurality of contacting rollers while step "a" is ongoing;
    (c) delivering said rubber sheet directly to an in-line cutter following joining step "b";
    (d) cutting said rubber sheet to a desired length;
    (e) placing a pile fabric on said rubber sheet to form a pile composite; and
    (f) vulcanizing said pile composite to form a unitary structure.

11. The invention as in claim 10, wherein said first and second strips of perforated carboxylated rubber each have a thickness greater than about 10 mils.

12. The invention as in claim 11, wherein said rubber sheet has a thickness not greater than about 65 mils.

13. A dust mat formed according to the process of claim 1.

14. A dust mat formed according to the process of claim 9.

15. A dust mat formed according to the process of claim 10.

16. A dust mat formed according to the process of claim 12.

* * * * *